United States Patent
Menon et al.

(10) Patent No.: US 8,785,067 B2
(45) Date of Patent: Jul. 22, 2014

(54) WAX ELEMENTS AS PASSIVE CONTROL DEVICES IN FUEL CELL POWER SYSTEMS

(75) Inventors: Prem Menon, Pittsford, NY (US); John J. Conley, Morgantown, WV (US); David A. Masten, Rochester, NY (US); Bruce J. Clingerman, Palmyra, NY (US)

(73) Assignee: GM Global Technology Operations LLC, Detroit, MI (US)

(*) Notice: Subject to any disclaimer, the term of this patent is extended or adjusted under 35 U.S.C. 154(b) by 2421 days.

(21) Appl. No.: 11/671,379

(22) Filed: Feb. 5, 2007

(65) Prior Publication Data

US 2008/0187803 A1 Aug. 7, 2008

(51) Int. Cl.
*H01H 37/46* (2006.01)
*H01M 8/04* (2006.01)

(52) U.S. Cl.
CPC ...... *H01M 8/04029* (2013.01); *H01M 8/04731* (2013.01); *H01M 8/04141* (2013.01); *H01M 8/0435* (2013.01); *H01M 8/04761* (2013.01); *Y02E 60/50* (2013.01); *H01M 8/04768* (2013.01); *H01M 8/04776* (2013.01); *H01M 8/04156* (2013.01); *H01M 8/04014* (2013.01); *H01M 8/04358* (2013.01)
USPC .......................................... 429/433; 337/123

(58) Field of Classification Search
None
See application file for complete search history.

(56) References Cited

U.S. PATENT DOCUMENTS

| | | | | |
|---|---|---|---|---|
| 3,771,088 A | * | 11/1973 | Sliger | 337/123 |
| 4,357,589 A | * | 11/1982 | Payne | 337/315 |
| 6,743,539 B2 | * | 6/2004 | Clingerman et al. | 429/435 |
| 2002/0037447 A1 | | 3/2002 | Imaseki | |
| 2008/0265044 A1 | * | 10/2008 | Maier | 236/101 A |

* cited by examiner

*Primary Examiner* — Keith Walker
(74) *Attorney, Agent, or Firm* — John A. Miller; Miller IP Group, PLC

(57) ABSTRACT

A fuel cell system that employs one or more wax elements to provide passive control. In one embodiment, a wax element device is positioned within a coolant stream pipe. The wax element device includes a wax element positioned within a container. An electrically conductive rod is positioned within the wax element and extends out of the pipe. As the wax element expands and contracts in response to temperature changes in the cooling fluid, the rod moves up and down to make various electrical contacts and control the various devices, such a coolant pump and a coolant fan. In another embodiment, the rod extends into a cathode exhaust pipe of the fuel cell system, and is coupled to a back-pressure valve therein. As the temperature of the cooling fluid changes, the wax element expands and contracts to control the position of the back-pressure valve.

11 Claims, 4 Drawing Sheets

WAX ELEMENTS AS PASSIVE CONTROL DEVICES IN FUEL CELL POWER SYSTEMS

BACKGROUND OF THE INVENTION

1. Field of the Invention

This invention relates generally to a fuel cell system and, more particularly, to a fuel cell system that employs wax elements as passive control devices to control certain system components, such as coolant fans, coolant pumps and valves in the system.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode, with the aid of a catalyst, to generate free hydrogen protons and electrons. The hydrogen protons pass through the electrolyte to the cathode. The hydrogen protons react with the oxygen and the electrons in the cathode, with the aid of a catalyst, to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorinated acid membrane. The anode and cathode typically include finely divided catalytic particles, usually platinum (Pt), supported on carbon particles and mixed with an ionomer. The combination of the anode, cathode and membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Many fuel cells are typically combined in a fuel cell stack to generate the desired power. The fuel cell stack receives a cathode charge gas that includes oxygen, and is typically a flow of forced air from a compressor. Not all of the oxygen in the air is consumed by the stack and some of the air is output as a cathode exhaust gas that may include water as a stack by-product. The stack also receives a hydrogen anode gas. A cooling system is generally required to remove heat from the stack generated by its operation.

The known control systems for a fuel cell cooling system employ sensors, powertrain controllers and actuators to perform the control. It would be desirable to eliminate some of these devices to reduce system complexity, weight, etc.

Wax element devices are known in the electronics industry as simple electrical switching devices. It would be desirable to employ such wax element devices to provide passive control in fuel cell systems.

SUMMARY OF THE INVENTION

In accordance with the teachings of the present invention, a fuel cell system is disclosed that employs one or more wax elements to provide passive control. In one embodiment, a wax element device is positioned within a coolant stream pipe. The wax element device includes a wax element positioned within a container, where the container is mounted to the pipe. An electrically conductive rod is positioned within the wax element and extends out of the pipe. As the wax element expands and contracts in response to temperature changes in the cooling fluid, the rod moves up and down to make various electrical contacts and control the various devices, such a coolant pump and a coolant fan.

In another embodiment, the rod extends into a cathode exhaust pipe of the fuel cell system, and is coupled to a back-pressure valve therein. As the temperature of the cooling fluid changes, the wax element expands and contracts to control the position of the back-pressure valve, and thus the pressure within the fuel cell stack. Alternately, the entire wax element device can be positioned within the cathode exhaust pipe and be calibrated to the temperature of the cathode exhaust to provide the same control.

Additional features of the present invention will become apparent from the following description and appended claims, taken in conjunction with the accompanying drawings.

DETAILED DESCRIPTION OF THE EMBODIMENTS

The following discussion of the embodiments of the invention directed to the use of wax elements for controlling various parts of a fuel cell system is merely exemplary in nature and is in no way intended to limit the invention or its applications or uses.

Figure 1:
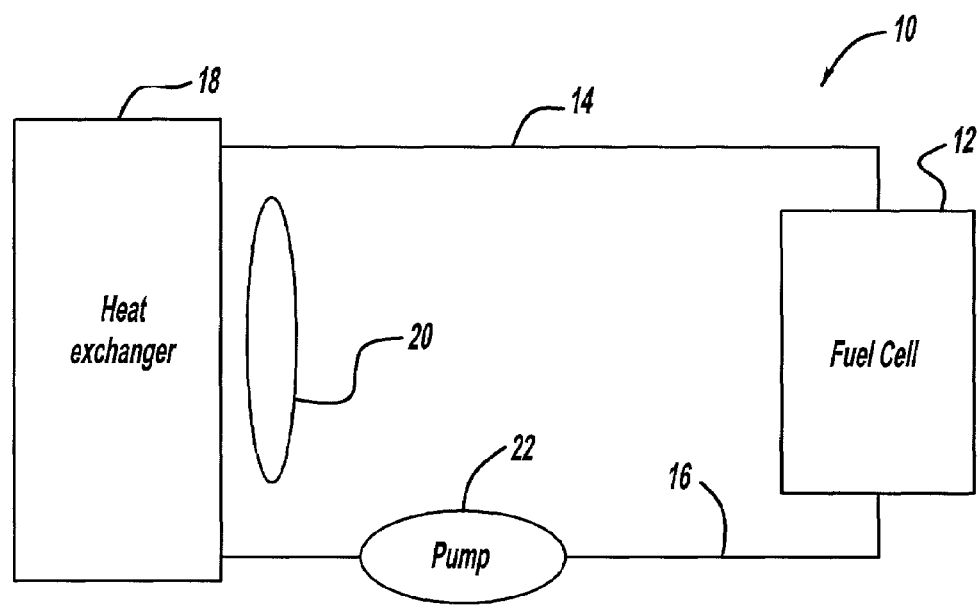
FIG. 1 is a simplified block diagram of a known cooling system for a fuel cell system.

FIG. 1 is a simplified plan view of a cooling system 10 for a fuel cell module 12 generally depicting the type known in the art. The module 12 receives a cooling fluid on line 14 that flows through cooling channels within the module 12 to remove heat therefrom. The heated cooling fluid is output from the module 12 on line 16 and sent to a heat exchanger 18 to cool the heated cooling fluid. A fan 20 forces air through the heat exchanger 18 to cool the cooling fluid, and the cooled cooling fluid is then returned to the fuel cell module 12 on the line 14. A pump 22 pumps the cooling fluid through the system 10.

Various sensors, switches, valves, etc. are known in the art for controlling the operation of the cooling system 10 and maintaining the module 12 at a desired operating temperature. The fuel cell module 12 may require different levels of cooling depending on its output power demand, whether it is at start-up, etc. For example, a sensor may sense when the module 12 reaches a certain temperature, and cause a switch to switch on the pump 22. If the temperature of the module 12 increases to a higher temperature, the sensor may then cause another switch to switch on the fan 20. If the temperature of the module 12 increases to yet a higher temperature, the sensor may cause the speed of the fan 20 to increase. Various cooling schemes are know in the art for various fuel cell systems and applications.

Figure 2:
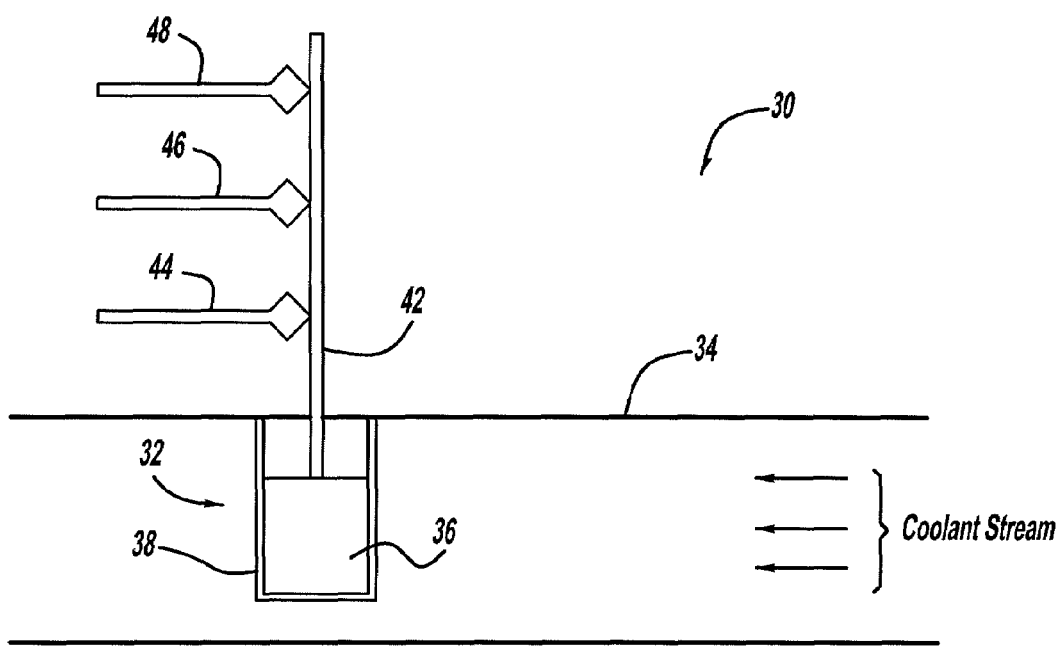
FIG. 2 is a plan view of part of a fuel cell system employing a wax element for controlling a cooling fan and/or a cooling pump, according to an embodiment of the present invention.

FIG. 2 is a plan view of part of a cooling control system 30 for a fuel cell system that employs a wax element actuation device 32, according to an embodiment of the present invention. The device 32 is positioned within a coolant pipe 34 within the system 30, such as in one of the lines 14 or 16. The device 32 includes a wax element 36 formed within a container 38. The container 38 is rigidly mounted to the pipe 34 by bolts, screws, or the like. An electrically conductive rod 42 is rigidly positioned within the wax element 32 and extends out of the pipe 34, as shown. The hole in the pipe 34 that the rod 42 extends out of is sealed around the pipe 34 so that cooling fluid within the pipe 34 does not leak out. The device 32 can also be positioned with the cathode exhaust stream to operate in the same manner. The wax element device 32 is calibrated to the temperature of a cathode exhaust instead of the temperature of the cooling fluid in this design.

The wax element 36 expands and contracts in response to temperature changes, and the rod 42 moves up and down in response to the expansion and contraction of the wax element 36. The system 30 includes a ground or voltage source, electrical contact 44, such as 5V, 12V, 42V, etc., a first signal electrical contact 46 and a second signal electrical contact 48 positioned as shown relative to the rod 42. When the temperature of the cooling fluid in the pipe 34 is low, the wax element 36 is contracted and the rod 42 only contacts the ground contact 44. As the temperature of the cooling fluid increases, the rod 42 moves upwards toward the electrical contact 44. When the rod 42 contacts the contact 44 a circuit is closed and a device is activated, such as the pump 22 to cause the cooling fluid to flow through the radiator 18 to reduce the temperature of the cooling fluid. As the temperature of the cooling fluid continues to rise, the rod 42 will eventually contact the electrical contact 48 and close another electrical circuit to turn on another device, such as the fan 20 to further cool the cooling fluid. As the cooling fluid cools, the devices are turned off in the same manner.

The contacts 46 and 48 can operate other circuits than those discussed above. For example, the contact 46 can operate the fan 20 at a first low speed and the contact 48 can operate the fan 20 at a second higher speed. Further, more contacts can be provided to operate more circuits for other designs.

Figure 3:
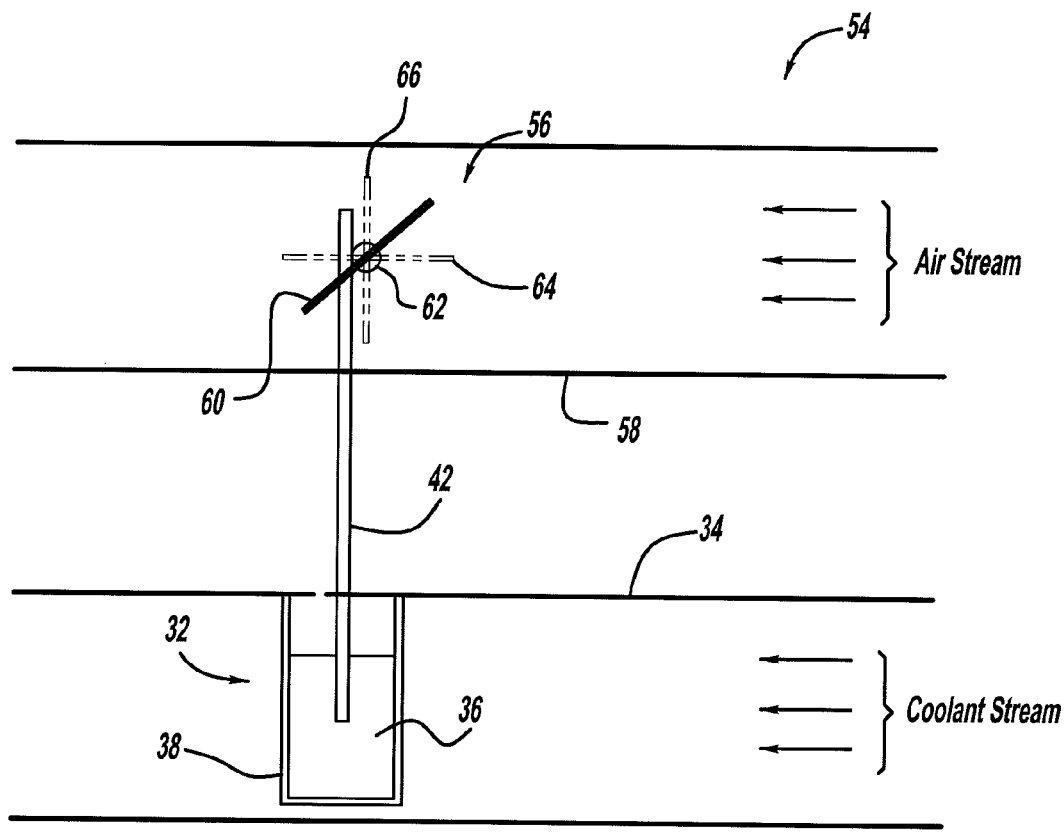
FIG. 3 is a plan view of part of a fuel cell system employing a wax element for controlling a cathode exhaust back-pressure valve, according to another embodiment of the present invention.

At high fuel cell power and temperature, there may not be enough water in the stack to maintain the desired stack relative humidity to prevent stack damage. It is known in the art to employ a back-pressure valve in the cathode exhaust of a fuel cell stack to increase the stack pressure to control the stack humidity as the stack temperature increases. Particularly, as the temperature of the stack increases, the back-pressure valve is systematically closed to increase stack pressure and provide the desired stack humidity control. FIG. 3 is a plan view of part of a fuel cell system 54 that employs the wax element device 32 to control a back-pressure valve 56 positioned in a cathode exhaust pipe 58, where like elements are identified by the same reference numeral. The rod 42 extends into the exhaust pipe 58 in a sealed manner, and is mechanically coupled to a valve flap 60 of the back-pressure valve 56. The valve flap 60 is rotatably coupled to a rod 62 extending transverse to the flow direction of the cathode exhaust through the pipe 58.

When the cooling fluid is at a low temperature, back-pressure is typically not required, and thus, the rod 42 positions the flap 60 at position 64 so that it aligns with the flow direction of the exhaust and the back-pressure is minimal. As the temperature of the cooling fluid increases and the rod 42 rises, the flap 60 rotates towards position 66 where maximum back-pressure is provided. The back-pressure valve 56 can provide discrete valve positions between the positions 64 and 66, or can provide continuous positions between the positions 64 and 66.

Figure 4:
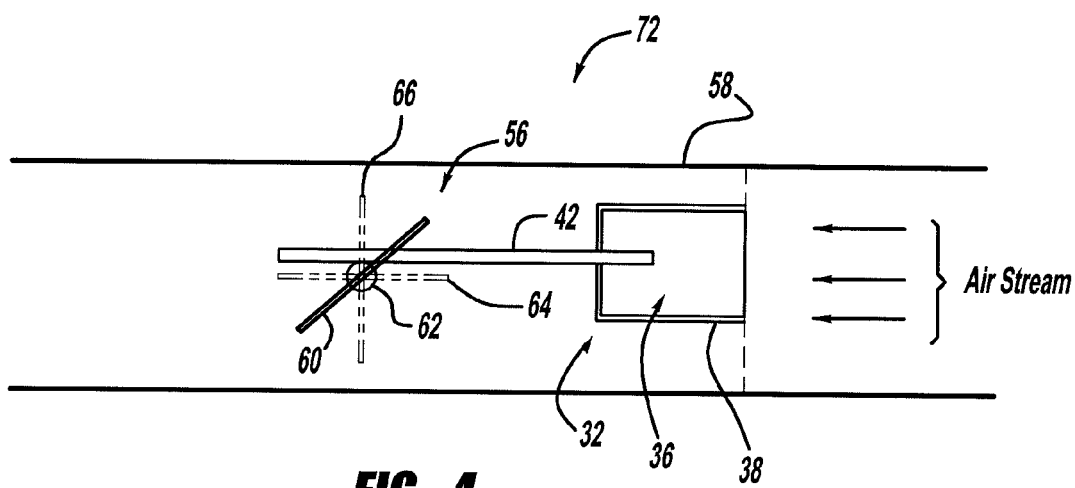
FIG. 4 is a plan view of part of a fuel cell system employing a wax element for controlling a cathode exhaust back-pressure valve, according to another embodiment of the present invention.

FIG. 4 is a plan view of part of a fuel cell system 72 that is similar to the system 54, according to another embodiment of the present invention, where like elements are identified by the same reference numeral. In the system 72, the wax element device 32 is positioned within the cathode exhaust pipe 58, where the container 38 is mounted to the pipe 58. The back-pressure valve 56 and the wax element device 32 are calibrated to the temperature of the cathode exhaust instead of the temperature of the cooling fluid in this design. Further, this design eliminates the need to seal the pipes 34 and 58 where the rod 42 extends through.

Figure 5:
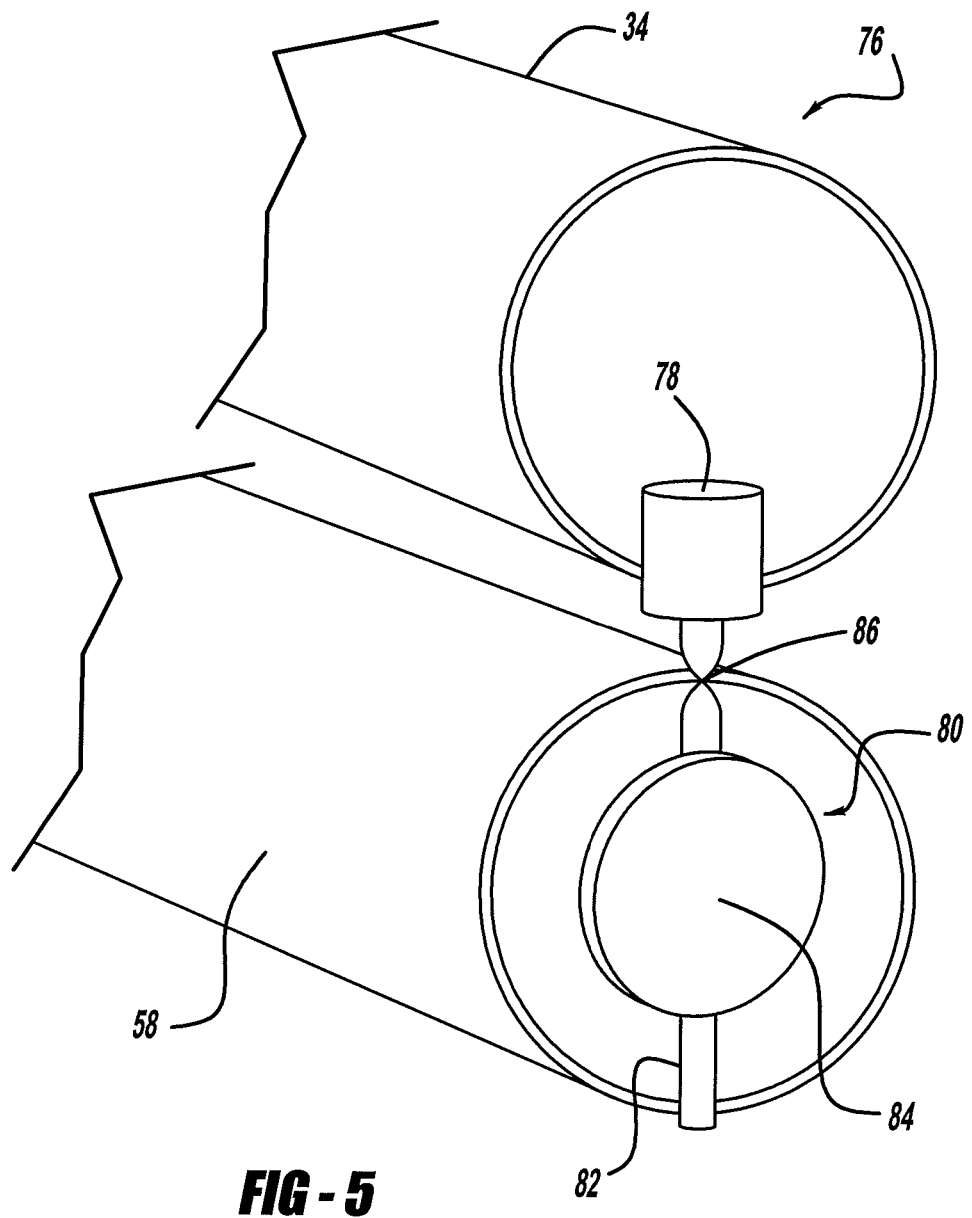
FIG. 5 is a plan view of part of a fuel cell system employing a wax element for controlling a cathode exhaust back-pressure valve, according to another embodiment of the present invention.

Different back-pressure valve designs can be employed consistent with the invention disclosed herein. FIG. 5 is a perspective view of part of a fuel cell system 76, according to another embodiment of the present invention, where like elements are identified by the same reference numeral. In this embodiment, a wax element device 78 is mounted within the wall of the pipe 34. A butterfly valve 80 is mounted within the exhaust pipe 58. The butterfly valve 80 includes a valve shaft 82 and a blade 84 mounted thereto. The valve shaft 82 extends out of the pipe 58 and is coupled to the wax element device 78. The shaft 82 is a flat shaft having a 90° twist 86. As the temperature of the cooling fluid increases, the shaft 82 is forced downward and moves through a slot in the pipe 58. The twist 86 causes the blade 84 to turn within the pipe 58. By properly calibrating the device 78, the shaft 82 and the position of the blade 84, the blade 84 will turn in the pipe 58 so that it restricts the pipe 58 at high coolant temperatures and not restrict the pipe 58 at low coolant temperatures to provide the desired humidity control.

The butterfly valve 80 is a forced balance valve that moves with a low actuation force, so that the actuating force only needs to overcome the bearing friction. The seal of the shaft 82 to the pipe 58 can be relatively loose because small cathode leaks are harmless. Also, the size of the blade 84 relative to the opening in the pipe can be such that if the valve 80 fails, the pipe 58 will not be completely closed, thus avoiding a dead-headed compressor condition.

Figure 6:
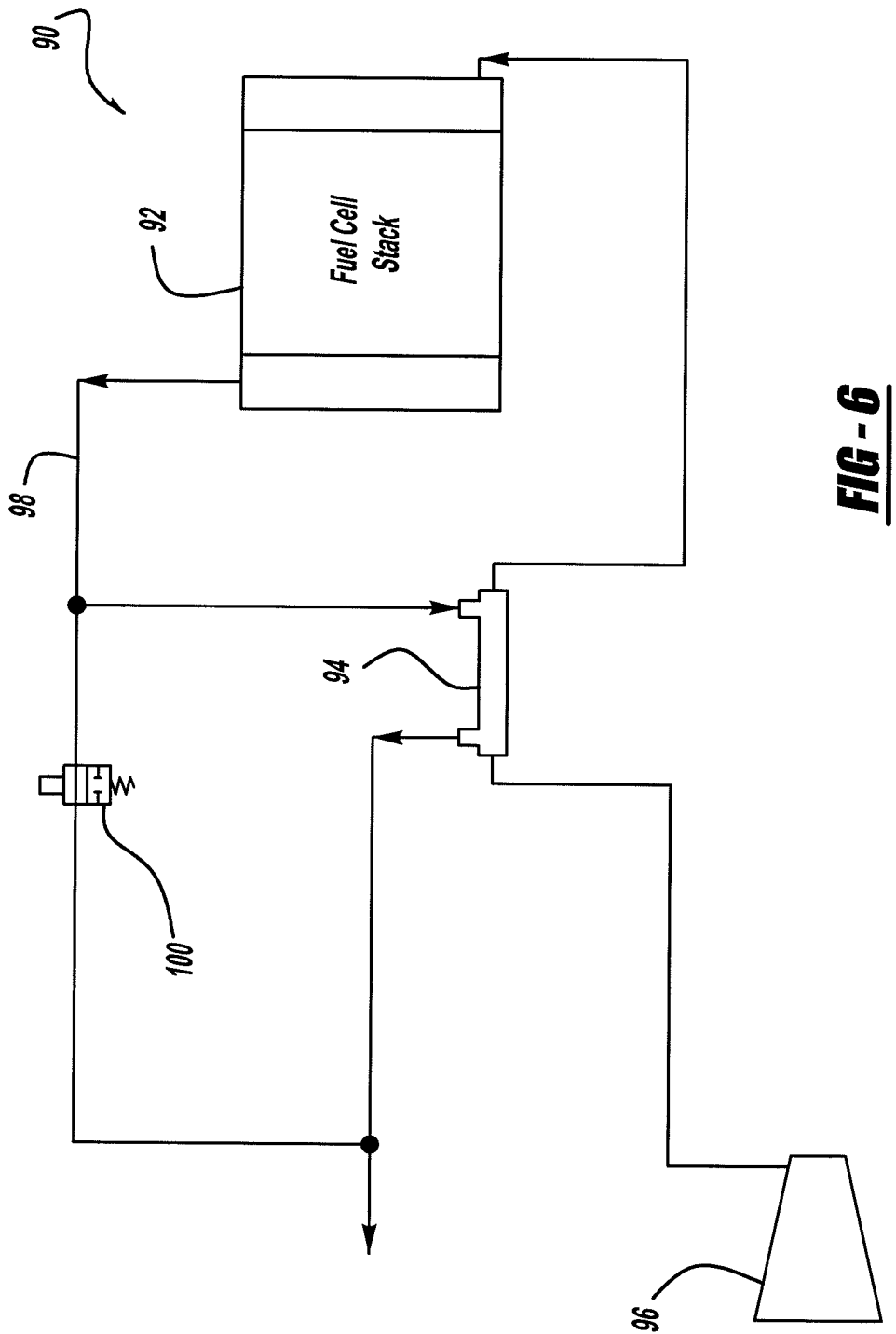
FIG. 6 is a plan view of a fuel cell system employing a water vapor transfer unit, according to another embodiment of the present invention.

The various wax element devices discussed above can be employed in other parts of a fuel cell system where thermal activation is required. FIG. 6 is a plan view of a fuel cell system 90 including a fuel cell stack 92 depicting one such example, according to another embodiment of the present invention. As is known, the cathode exhaust flowing through a cathode exhaust gas line 98 from the fuel cell stack 92 includes water as a stack by-product. In certain fuel cell designs, the cathode exhaust may be sent through a water vapor transfer unit 94 to remove the water therefrom. The water removed by the transfer unit 94 can then be used to humidify the cathode air input. Particularly, cathode charge air from a compressor 96 is sent through the water vapor transfer unit 94 before being sent to the stack 92.

However, a design challenge exists with this type of fuel cell system. In low temperature conditions at vehicle start-up, the water remaining within the transfer unit 94 may be frozen, and thus may restrict or prevent the cathode exhaust from flowing therethrough. A by-pass valve 100 can be used to by-pass the water vapor transfer unit 94 in the cathode exhaust gas line 98 during system start-up to direct the cathode exhaust gas around the water vapor transfer unit 94. Particularly, if the system 90 is above a certain temperature, then the by-pass valve 100 will be closed so that the cathode exhaust gas goes through the water vapor transfer unit 94. However, if the system 90 is below a certain temperature, the by-pass valve 100 will be opened so that the cathode exhaust gas does not go through the water vapor transfer unit 94.

The by-pass valve 100 can be any one of the temperature sensitive wax element devices discussed above suitable for this purpose. The ice within the transfer unit 94 will eventually melt from the elevated temperature of the charge air from the compressor 96. The water vapor transfer unit 94 is not needed at low temperatures because the relative humidity of the charge air is sufficiently high.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack including a stack of fuel cells; and
a cooling system for cooling the fuel cell stack, said cooling system including a cooling line delivering cooled cooling fluid to the stack and removing heated cooling fluid from the stack, said cooling system further including a wax element device positioned within the cooling line, said wax element device including a container mounted to the cooling line, a wax element positioned within the container and a rod mounted to the wax element and extending out of the cooling line, said wax element expanding and contracting in response to temperature changes to the cooling fluid, said rod moving in response to the expansion and contraction of the wax element to provide control of at least one fuel cell system device.

2. The fuel cell system according to claim 1 wherein the cooling system further includes a pump for pumping the cooling fluid through the cooling line, said rod electrically activating and deactivating the pump in response to movement of the rod.

3. The fuel cell system according to claim 1 wherein the cooling system further includes a radiator and a fan, said rod electrically activating and deactivating the fan in response to movement of the rod.

4. The fuel cell system according to claim 3 wherein the rod selectively activates the fan at more than one speed depending on the temperature of the cooling fluid.

5. The fuel cell system according to claim 1 wherein the stack includes a cathode exhaust line, said fuel cell system further comprising a back-pressure valve positioned within the exhaust line, said rod being coupled to the back-pressure valve and opening and closing the back-pressure valve in response to temperature changes to the cooling fluid.

6. The fuel cell system according to claim 5 wherein the back-pressure valve is a butterfly valve.

7. The fuel cell system according to claim 5 wherein the back-pressure valve includes a blade mounted to the rod and the rod includes a twist, and wherein the twist in the rod causes the blade to turn in response to movement of the rod.

8. The fuel cell system according to claim 7 wherein the twist in the rod is a 90° twist.

9. The fuel cell system according to claim 1 wherein the cooling system further includes a pump for pumping the cooling fluid through the cooling line, where said at least one fuel cell system device includes the pump, and wherein movement of the controls the operation of the pump by making an electrical connection with at least one electrical contact when the rod moves a certain distance as a result of the wax element expansion, said at least one electrical contact including a first and a second electrical contact where movement of the rod as a result of the wax element expansion causes an electrical connection to be made between the first and second electrical contacts to turn on the pump when the temperature of the cooling fluid reaches a first temperature.

10. The fuel cell system according to claim 9 wherein the cooling system further includes a radiator and a fan, where said at least one fuel cell system device includes the fan, said at least one electrical contact including a third electrical contact where movement of the rod as a result of the wax element expansion causes an electrical connection to be made between the first electrical contact and the third electrical contact to turn on the fan when the temperature of the cooling fluid reaches a second temperature greater than the first temperature.

11. The fuel cell system according to claim 1 wherein the cooling system further includes a radiator and a fan, where said at least one fuel cell system device includes the fan, and wherein movement of the controls the operation of the fan by making an electrical connection with at least one electrical contact when the rod moves a certain distance as a result of the wax element expansion, said at least one electrical contact including a first contact, a second contact, and a third contact, where movement of the rod as a result of the wax expansion causes an electrical connection to be made between the first and second contacts to operate the fan at a first fan speed when the temperature of the cooling fluid reaches a first temperature and causes an electrical connection to be made between the first contact and the third contact to operate the fan at a second fan speed greater than the first fan speed when the temperature of the cooling fluid reaches a second temperature greater than the first temperature.

* * * * *